Feb. 26, 1952     G. GERSON     2,586,935
GAS FILTER

Filed March 26, 1948     2 SHEETS—SHEET 1

Inventor
Gerhard Gerson

By Barlow & Barlow
Attorneys

Feb. 26, 1952 — G. GERSON — 2,586,935
GAS FILTER
Filed March 26, 1948 — 2 SHEETS—SHEET 2

Inventor
Gerhard Gerson
By Barlow & Barlow
Attorneys

Patented Feb. 26, 1952

2,586,935

UNITED STATES PATENT OFFICE 2,586,935

GAS FILTER

Gerhard Gerson, Rumford, R. I., assignor to Fram Corporation, a corporation of Rhode Island Application March 26, 1948, Serial No. 17,169

7 Claims. (Cl. 183—45)

This invention relates to gas separation wherein foreign matter carried in a gas is removed therefrom. More particularly, the invention has to do with an air filter for filtering the air which passes into the carburetor of an internal combustion engine or into a compressor or the like.

The air cleaners which at present are used to protect engines, compressors and the like against dust and other foreign matter floating in the air do not remove all the dust. Their cleaning efficiency depends largely upon the operation conditions, that is, upon the air velocity through the air cleaner. The higher the air velocity, the higher is the cleaning efficiency. It is therefore that during such times during which the highest cleaning efficiency ought to be required it cannot be obtained because the air velocity is low.

Since a "quiet engine" especially with passenger cars is an aim of every manufacturer, it is important that sounds be deadened before reaching the outside of the engine. Accordingly, there is usually associated with air filters some short of a resonator or a combination of resonating devices which are so designed as to eliminate the noise by attenuating in one step or in stages the dominating sound waves of particular frequencies.

One of the objects of this invention is to provide a filter which will give a high rate of flow of air therethrough and which will also give a high percentage of dust removal.

A further object of this invention is to eliminate the periodic cleaning and washing of the air cleaner, rather provide a replaceable throw-away cartridge of extremely simple construction which also can be used in existing air cleaner bodies and resonators.

Another object of this invention is to provide an air cleaner design in combination with a replaceable cartridge through which the air will pass without reversal of flow and in which the cartridge will cooperate with the resonator in deadening noises.

Another object of this invention is to avoid plugging of the filtering material by applying the principle of cleaning the air in two or more than two stages, which stages are formed by blending coarse curled fibres and fine fibres in varying proportions, the last stage being always a cleaner having a dust removal rate close to or equal to 100%. That means when a high percentage of the dust and foreign matter has been removed from the intake air when passing through the first stage or stages, the last stage will remove the remaining few percent, which otherwise would enter an engine and do damage. These remaining few percent of extremely fine dust particles represent a quantity negligible in comparison with the total quantity of dust contained in the air, but still important as far as engine wear is concerned.

Another object of this invention is to treat the filtering materials used in the different stages, especially of the stage which is directly connected with the carburetor inlet, so as to make these materials non-inflammable and prevent burning of the materials in case of back-firing of the engine.

With these and other objects in view, the invention consists of certain novel features of construction, as will be more fully shown and particularly pointed out in the appended claims.

In proceeding with this invention, I have designed a cartridge which is in the form of an inverted cup having an open bottom and openings at the upper portion thereof and in which there is a filter element comprising a fibrous material and this may carry some adhesive to which the dust will more readily adhere. Where a deep penetration of the fibrous material is desired by the dust, the fibrous material is blended with other fibers in layers of progressively increasing density so that the dust will penetrate rather readily through the first few layers contacted but will be caught by the last layer, this, of course, varying with the particle size of the dust so that the coarser particles are caught in the coarser layer through which the air to be filtered first passes. The resonator which I provide is a chamber having an inclined wall with a restricted opening directing the air waves or pulsations against this inclined wall so as to reflect them, the volume being of such a size that the sound waves which are most prominent and which it is desired shall be eliminated will be neutralized.

Figure 1:
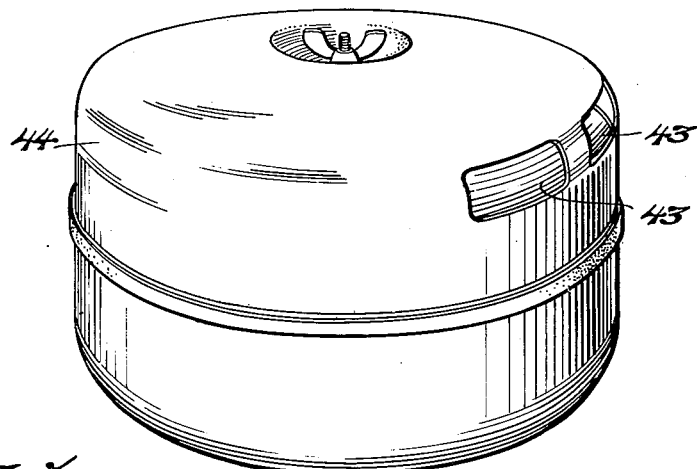
Fig. 1 is a perspective view of the filter and resonator complete.
Figure 2:
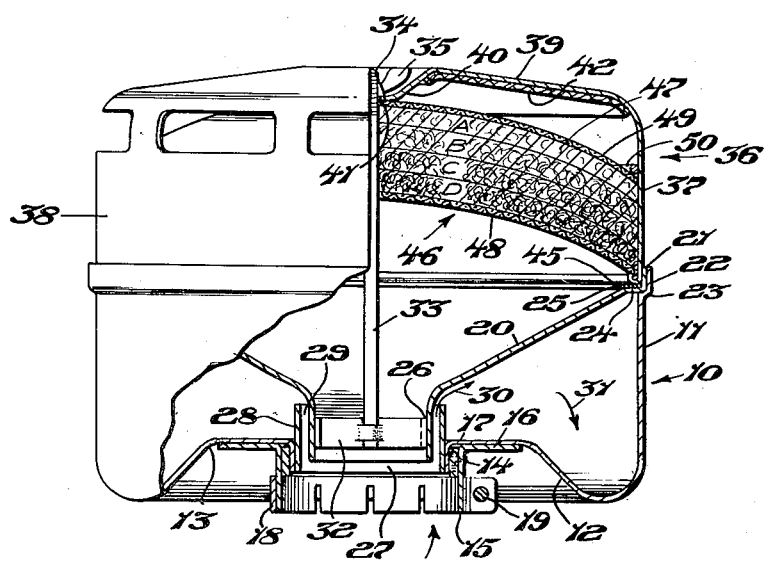
Fig. 2 is an elevation partly in section through the structure of Fig. 1.

With reference to the drawings, and particularly Figs. 1 and 2, 10 designates generally a resonator which has a cylindrical wall 11 designed to be vertically disposed and a bottom wall 12 which is deflected inwardly to provide a cup portion 13, this wall then extending downwardly as at 14. A contractible collar 15 is attached to this bottom wall by a flange 16, such as by welding, and a packing 17 is provided between this collar and the downwardly extending portion 14 so as to provide a tight joint. This collar may be contracted by a ring 18 actuated by a bolt and nut indicated at 19. A top wall 20 is provided for the resonator which at its upper outer edge has a flange 21 which nests with an outwardly extending flange 22 on the wall 11, there being formed a shoulder 23 for the seating of the horizontal portion 24 of the outer edge of this top wall, this portion 24 presenting a surface upon which there is a gasket 25 to present an annular sealing area for the cartridge. This top wall 20 inclines downwardly as it proceeds inwardly and at its lower end there is a tubular formation 26 extending into the opening 27 provided by the downwardly extending portion 14 of the bottom wall. A collar 28 is attached to this downwardly extending portion 14 and extends upwardly in spaced relation to the tubular portion 26 so as to provide a restricted conduit 29, which as shown by arrow 30 so aims the air pulsations which pass through this conduit 29 that they will impinge against the inclined wall 20 and will be reflected therefrom, such as indicated by arrow 31. The tube 26 has a strut 32 extending across the tube so as to support a rod 33 threaded at its upper end as at 34 and carrying a wing nut 35.

This resonator 10 will be attached to the air intake entrance of the carburetor by contracting the ring 18 and will usually remain attached to the carburetor for an extended length of time.

The cartridge which is assembled with this resonator is designated generally 36 and comprises an outer shell 37 which is in the shape of an inverted cup having an opened bottom with a cylindrical wall 38 and a somewhat domed top wall 39 which is recessed as at 40 and provided with a hole 41 through which the rod may extend, while the recess receives the wing nut 35. On the under side of this wall 39 a soft pad such as a felt material 42 is provided for the absorption of air pulsations which may reach a pitch to be audible. Through a part of the area of the junction between the top wall 39 and the cylindrical wall 38, there are a plurality of openings 43 provided for air to enter the shell and pass out through the open bottom. A part of this area designated 44 is left without openings as a shield against the onrushing of air against the shell.

The lower edge of the cylindrical wall 38 is rolled inwardly as at 45 so as to provide a smooth annular surface which will present a sealing area to engage the gasket 25 and provide an air tight seal at this location when the cartridge is assembled on the resonator and drawn down tightly with the wing nut 35.

The filter element is contained within the shell 37 of the cartridge 36 and is designated generally 46. It comprises essentially fibrous material at 47 held between a lower screen 48 which rests upon the inturned edge 45 and an upper screen 49 which is in engagement with the downwardly projecting portion 40 of the top wall at its mid portion and which engages below a ring 50 which may be secured to the shell by welding. This fibrous material will have a density dependent upon the amount of flow desired and the amount of solid dust particles which are to be removed. I have found that curled cattle tail hair may serve as the fibrous element and its action may be improved by treatment so that it will carry a material which will cause the dust particles to adhere thereto. While cattle tail hair may serve in most cases I have found that casein fibers are preferable, these being furnished in a length of about 15" to 18" with a diameter of .005" to .007" and are curled. They present a very good resiliency, much better than cattle tail hair and are satisfactory where moisture occurs but would not be satisfactory should the entire medium at any time be immersed in water.

A certain resiliency or springiness of the fibers which are used is required and both the cattle tail hair and the casein fibers present this required resiliency. However, their nature is such that they will present rather large openings for the air to pass through and accordingly where it is desired that a greater removal of the dust occur, I find that I can increase the dust removal by blending wool with the cattle tail hair or the casein fibers. The more wool that I use in proportion to these fibers, the greater will be the removal rate of the dust. However, in order that I may have a deep penetration and have a very free flow at the beginning of the passage of the air through the fibers and a more restricted flow of the air as it leaves the fibrous material, I have found that it is desirable to provide different layers of material and I have illustrated in the drawings four different layers which are designated A, B, C, and D. In the first of these layers, A, there will be provided only the resilient fibers such as cattle tail hair or casein. In the next layer, B, there will be 80 per cent of the resilient fibers and 20 per cent wool fibers, or some more densely packing fibers such as wool. In the next layer, C, there will be 70 per cent of the resilient fibers and 30 per cent of the denser packing fibers such as wool, and in the last layer, D, there will be 60 per cent of the resilient fibers and 40 per cent of the denser packing fibers. In this manner, I find that I get a very deep penetration of the dust into the material and yet obtain a very high removal rate of the dust and in tests which have been made, this removal rate is superior to the removal rate where there are no layers even though a blend may occur.

In all uses above indicated of the fibers, whether blended or not blended, the dust collecting action is improved by treatment with some material which will cause the dust to adhere to it. As there is some fire hazard due to carburetor backfire, this adhesive material should be non-inflammable and the material which I have found to be best for the purpose is tricresyl phosphate. An emulsion is prepared comprising 100 parts of tricresyl phosphate, 100 parts of water, and 2 parts of soap by weight and sprayed onto the element. An element weighing 55–65 grams is sprayed with 25–30 grams of emulsion, which when the water evaporates leaves 12½ to 15 grams of tricresyl phosphate in the element.

Figures 3, 4:
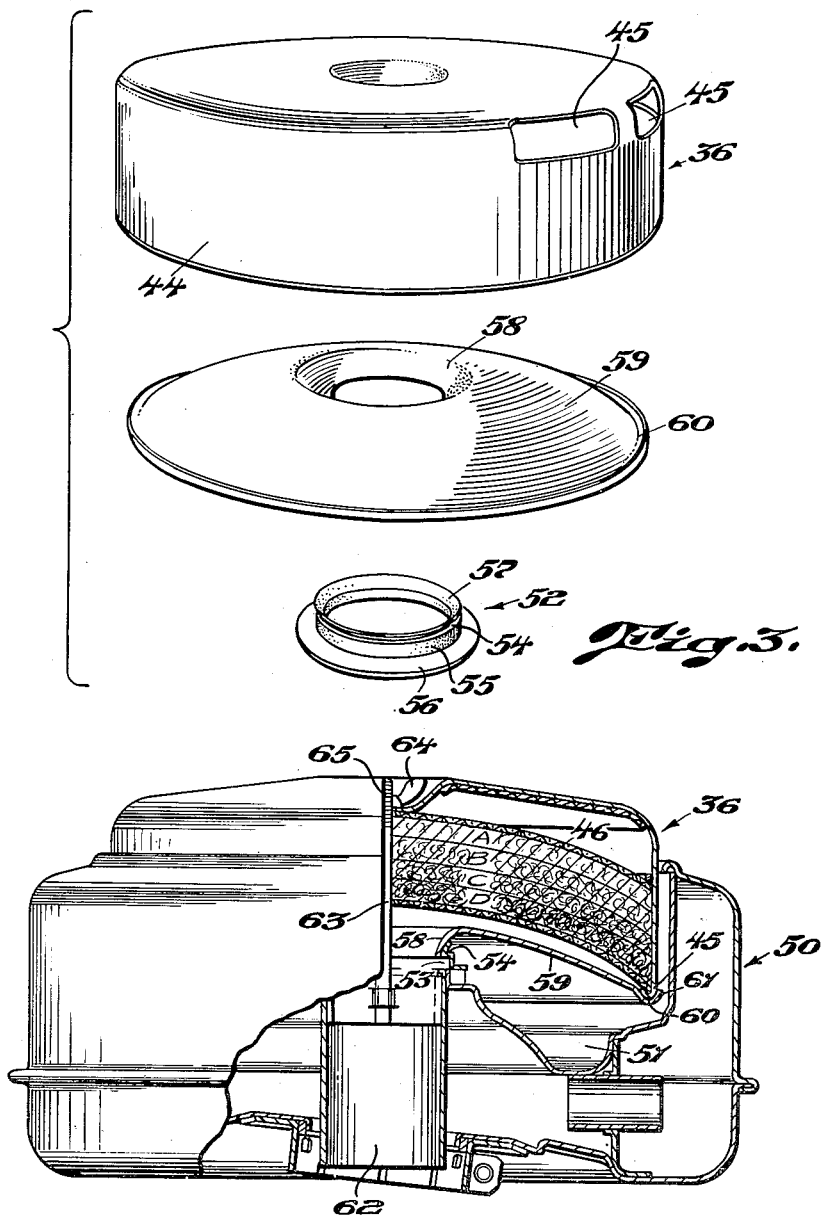
Fig. 3 is an exploded view illustrating the filter cartridge and two parts which are associated with the cartridge when the structure is used for replacing the filter means in association with a resonator which is already on the market.
Fig. 4 is an elevation partly in section illustrating the parts of Fig. 3 assembled with a resonator of a somewhat different construction than that shown in Fig. 2.

In the showing in Fig. 3, I have provided a cartridge which I designate 36 and which is identical with the cartridge shown at 36 and above described in Fig. 4. This cartridge 36 is shown as assembled with a resonator designated generally 50 which resonator represents a resonator which is on the market and is standard equipment on Ford automobiles. This resonator as provided in the Ford automobile, however, has a different air filter than that shown on my cartridge 36 and the resonator as used on the Ford automobile contains liquid in the trough 51 over which air passes. This cartridge 36 does away with the necessity of the provision of the liquid at 51 and in order to adapt the resonator 50 to the cartridge 36 I provide an adaptor comprising an annular member 52 which fits upon the tube 53 of the resonator by reason of a shoulder 54 engaging the outer end of this tube 53 with a cylindrical portion 55 telescoping the tube and a flange 56 extending outwardly therefrom, while upwardly from this shoulder portion 54 there extends a lip 57 which receives the inwardly extending edge 58 of a plate 59 which has at its outer edge a recess 60 which contains some resinous cementitious material 61 and presents by reason of this recess and resinous edge a means for sealing the lower rolled in edge 45 of the cartridge 36.

In operation, the air flows inwardly through the openings 43 in the cartridge, through the filtering element 46 and along the plate 59 and downwardly through center opening in the resonator which is designated generally 62. The cartridge is held in place by rod 63 and wing nut 64 engaging the threaded end 65 of this rod in the same manner that the cartridge 36 is held in place as above described. The filtering element 46 will be the same as above described.

I claim:

1. An air filter comprising a resonator having a central air conduit therethrough and an annular upwardly facing sealing surface spaced outwardly therefrom, a removable cartridge having a shell presenting a cooperating annular downwardly facing surface to engage and rest upon said sealing surface, said shell being generally in the shape of an inverted cup with an open bottom to communicate with said air conduit and having an opening in the shell at its upper portion for the admission of air, releasable means spaced from the sealing surfaces for urging the surfaces into sealing relation and a dust collecting medium positioned between the opening and open bottom, said medium comprising a fibrous material.

2. An air filter as in claim 1 wherein said shell has said opening adjacent the junction of the top and side walls thereof.

3. An air filter as in claim 1 wherein said shell has a cylindrical side wall and arched top wall with a plurality of said openings in said walls, said top wall being spaced from the dust collecting medium.

4. An air filter as in claim 1 wherein said shell has a cylindrical side wall and arched top wall with a plurality of said openings, adjacent the junction of the top and side walls in said walls, said top wall being spaced from the dust collecting medium.

5. An air filter having a cleaning element comprising wool fibers and casein fibers.

6. An air filter having a cleaning element comprising wool fibers and casein fibers, said fibers being intimately mixed together.

7. An air filter having a cleaning element comprising casein fibers.

GERHARD GERSON.

REFERENCES CITED

The following references are of record in the file of this patent:

UNITED STATES PATENTS

| Number | Name | Date |
|---|---|---|
| 342,099 | Howe | May 18, 1886 |
| 1,395,833 | Kling et al. | Nov. 1, 1921 |
| 1,439,151 | Dailey et al. | Dec. 19, 1922 |
| 1,499,864 | Gordon | July 1, 1924 |
| 1,898,027 | Winslow | Feb. 21, 1933 |
| 2,020,903 | Nickelsen | Nov. 12, 1935 |
| 2,058,932 | Wilson | Oct. 27, 1936 |
| 2,122,514 | Crocker et al. | July 5, 1938 |
| 2,138,874 | Myers | Dec. 6, 1938 |
| 2,243,082 | Brown | May 27, 1941 |
| 2,243,866 | Kamrath | June 3, 1941 |
| 2,331,693 | Jacobs et al. | Oct. 12, 1943 |
| 2,355,822 | Rugeley | Aug. 15, 1944 |
| 2,372,437 | Lathrop et al. | Mar. 27, 1945 |

FOREIGN PATENTS

| Number | Country | Date |
|---|---|---|
| 573,082 | Great Britain | Nov. 6, 1945 |